(12) United States Patent
Jin et al.

(10) Patent No.: US 11,075,841 B2
(45) Date of Patent: Jul. 27, 2021

(54) NETWORK CONGESTION CONTROL METHOD, DEVICE, AND SYSTEM

(71) Applicant: HUAWEI TECHNOLOGIES CO., LTD., Guangdong (CN)

(72) Inventors: Heng Jin, Shenzhen (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 33 days.

(21) Appl. No.: 16/585,848

(22) Filed: Sep. 27, 2019

(65) Prior Publication Data
US 2020/0028783 A1 Jan. 23, 2020

Related U.S. Application Data

(63) Continuation of application No. PCT/CN2017/079031, filed on Mar. 31, 2017.

(51) Int. Cl.
*H04W 4/00* (2018.01)
*H04L 12/801* (2013.01)
(Continued)

(52) U.S. Cl.
CPC .............. *H04L 47/11* (2013.01); *H04L 47/12* (2013.01); *H04L 47/14* (2013.01); *H04L 47/20* (2013.01); *H04L 47/2475* (2013.01)

(58) Field of Classification Search
None
See application file for complete search history.

(56) References Cited

U.S. PATENT DOCUMENTS

| 2012/0295630 A1 | 11/2012 | Wang et al. |
| 2015/0282058 A1 | 10/2015 | Forssell |

(Continued)

FOREIGN PATENT DOCUMENTS

| CN | 102083056 A | 6/2011 |
| CN | 102137507 A | 7/2011 |

(Continued)

OTHER PUBLICATIONS

3GPP TS 23.401 V14.3.0 (Mar. 2017),3rd Generation Partnership Project;Technical Specification Group Services and System Aspects;General Packet Radio Service (GPRS) enhancements for Evolved Universal Terrestrial Radio Access Network (E-UTRAN) access (Release 14), Mar. 2017. total 386 pages.

(Continued)

*Primary Examiner* — Elisabeth Benoit Magloire

(74) *Attorney, Agent, or Firm* — Womble Bond Dickinson (US) LLP

(57) ABSTRACT

Embodiments of this application provide a network congestion control method, a device, and a system, to dynamically control camping or handover of a user based on a user type, a service type, and a user location, thereby controlling congestion. A network device dynamically configures a grouped RFSP of a user based on information such as access network user plane congestion information without a need to modify subscription information of UE, selects, based on a user type and a service type, different networks/frequency bands/cells to control camping or handover, and instructs, by identifying a cell location, the user to select a frequency, to control congestion or the like.

15 Claims, 6 Drawing Sheets

(51) Int. Cl.
*H04L 12/813* (2013.01)
*H04L 12/859* (2013.01)

(56) References Cited

U.S. PATENT DOCUMENTS

| | | | |
|---|---|---|---|
| 2016/0050585 | A1 | 2/2016 | Shan |
| 2016/0269929 | A1* | 9/2016 | Livanos .............. H04L 12/1407 |
| 2017/0013502 | A1 | 1/2017 | Baniel et al. |
| 2017/0150394 | A1* | 5/2017 | Fan .................... H04L 47/2441 |
| 2017/0150395 | A1* | 5/2017 | Karlsson ................. H04W 4/02 |
| 2017/0265245 | A1* | 9/2017 | Yang ....................... H04W 8/24 |
| 2017/0311198 | A1* | 10/2017 | Monjas Llorente .. H04W 28/08 |
| 2018/0020370 | A1* | 1/2018 | Zhou ................... H04L 12/1407 |
| 2018/0098245 | A1* | 4/2018 | Livanos ................. H04L 47/14 |
| 2019/0014529 | A1* | 1/2019 | Karampatsis ....... H04W 40/248 |

FOREIGN PATENT DOCUMENTS

| | | |
|---|---|---|
| CN | 103517325 A | 1/2014 |
| CN | 104995960 A | 10/2015 |
| WO | 2016045739 A1 | 3/2016 |

OTHER PUBLICATIONS

Cisco et al., "Introducing RAN Congestion Awareness Function", SA WG2 Meeting #104 S2-142876 , Jul. 11, 2014, total 4 pages.

\* cited by examiner

NETWORK CONGESTION CONTROL METHOD, DEVICE, AND SYSTEM

CROSS-REFERENCE TO RELATED APPLICATION

This application is a continuation of International Application No. PCT/CN2017/079031, filed on Mar. 31, 2017. The disclosure of the aforementioned application is hereby incorporated by reference in its entirety.

TECHNICAL FIELD

Embodiments of this disclosure relate to communications technologies, and in particular, to a network congestion control method, a device, and a system.

BACKGROUND

With popularization of intelligent terminals, network traffic increases sharply due to emergence of various over the top (OTT) services, and radio cell congestion becomes common due to a relatively limited radio resource.

In a user plane congestion management (UPCON) architecture, a radio access network congestion awareness function (RCAF) obtains congestion information on a radio access network (RAN) side, and obtains an identity of a user served by a congested evolved NodeB (eNB) or cell from a mobility management entity (MME), for example, an international mobile subscriber identity (IMSI) or an access point name (APN); and then sends, to a policy and charging rules function (PCRF), access network user plane congestion information (RUCI) of each user equipment (UE). The PCRF and an evolved packet core (EPC) gateway are responsible for formulating a service priority policy, identifying a service flow, and assigning a priority identifier, and transmit the priority identifier to the RAN side, and then the RAN side performs differentiated priority scheduling on different services based on the service priority identifier.

In the prior art, a radio resource allocation policy is adjusted based on a service type, and congestion is controlled by optimizing configuration of a radio resource. However, when a large quantity of UEs in a frequency band/cell have a higher-priority service request, congestion is not better controlled by adjusting the radio resource allocation policy based on the service type.

SUMMARY

Embodiments of this disclosure provide a network congestion control method, a device, and a system, to dynamically control camping or handover of a user based on a user type, a service type, and a user location, thereby controlling congestion.

According to a first aspect of the embodiments of this disclosure, a network congestion control method is provided and includes:
  obtaining, by a network device, congestion information of a RAN;
  configuring, by the network device, a RAT/frequency selection priority (RFSP) of user equipment UE based on the congestion information of the RAN; and
  sending, by the network device to the RAN, a selection priority identifier (SPID) corresponding to the RFSP, where the SPID is used by the RAN to perform access control on the UE based on the SPID.

According to the network congestion control method provided above, the network device dynamically configures a grouped RFSP of a user based on information such as access network user plane congestion information (RUCI) without a need to modify subscription information of the UE, selects, based on a user type and a service type, different networks/frequency bands/cells to control camping or handover, and instructs, by identifying a cell location, the user to select a frequency, to control congestion or the like. According to the network congestion control method provided in this embodiment of this disclosure, when a large quantity of UEs in a frequency band/cell have a higher-priority service request, UE having a lower-priority service can be controlled to access another frequency band/cell instead of reducing QoS of a service of the UE having the lower-priority service, so that congestion is better controlled.

In one embodiment, the network device is a mobility management entity (MME), and the obtaining, by a network device, congestion information of a RAN includes: receiving, by the MME, congestion information that is of a RAN and that is sent by an RCAF, where the congestion information of the RAN includes a first access network user plane congestion information RUCI report and a network congestion level list, and the first RUCI comprises RUCI of all RANs managed by the MME.

Further, the configuring, by the network device, an RFSP of UE based on the congestion information of the RAN includes: adjusting, by the MME, the RFSP of the UE based on the first RUCI report and the network congestion level list.

In one embodiment, before the receiving, by the MME, congestion information that is of a RAN and that is sent by an RCAF, the method further includes: sending, by the MME, a message of a congestion information subscription request to the RCAF, where the message of the congestion information subscription request includes identifiers of all the RANs managed by the MME; and receiving, by the MME, a message that is sent by the RCAF and that is used to respond to the subscription request.

According to the network congestion control method provided in the foregoing embodiments, the MME reports, by using the RCAF, congestion statuses of all eNB s/cells managed by the MME, then dynamically adjusts the RFSP of the UE based on obtained RUCI, delivers the corresponding SPID to the RAN to adjust an access priority of a user, and controls camping of the user to adjust network congestion.

In one embodiment, the network device is an MME, and the obtaining, by a network device, congestion information of a RAN includes: receiving, by the MME, congestion information that is of a RAN and that is sent by a service capability exposure function (SCEF), where the congestion information of the RAN includes a second RUCI report, an identifier of the UE, and identifiers of all RANs specified by the SCEF, and the second RUCI comprises RUCI of all the RANs specified by the SCEF.

Further, the configuring, by the network device, an RFSP of UE based on the congestion information of the RAN includes: selecting, by the MME from the second RUCI report based on the identifier of the UE, congestion information of a RAN by which the UE is served; and configuring, by the MME, the RFSP of the UE based on a location of the UE, the congestion information of the RAN by which the UE is served, and subscription information of the UE.

In one embodiment, before the receiving, by the MME, congestion information that is of a RAN and that is sent by an SCEF, the method further includes: receiving, by the SCEF, a service request sent by an application program, where the service request includes location information of the UE; determining, by the SCEF based on the location information of the UE, a RAN list in which the UE is located, where RANs in the RAN list are all the RANs specified by the SCEF; sending, by the SCEF, a message of a congestion information subscription request to the RCAF, where the message of the congestion information subscription request includes the identifiers of all the RANs specified by the SCEF; and receiving, by the SCEF, the second RUCI report sent by the RCAF.

According to the network congestion control method provided in the foregoing embodiments, the network device configures the SPID for a specific user based on the service request of the application program. The SCEF requests, from the RCAF, congestion information of a RAN in a location range of a user, and then reports the congestion information to the MME. The MME dynamically adjusts the RFSP based on the congestion information and delivers the RFSP to the RAN to adjust an access priority of the user, and controls camping or handover of the user, to optimize a network of the specific user based on an application requirement.

In one embodiment, the network device is a PCRF, and the obtaining, by a network device, congestion information of a RAN includes: receiving, by the PCRF, congestion information that is of a RAN and that is sent by an RCAF, where the congestion information of the RAN includes a third RUCI report and an identifier of the UE, and the third RUCI comprises RUCI of a RAN in which congestion occurs.

Further, the configuring, by the network device, an RFSP of UE based on the congestion information of the RAN includes: adjusting, by the PCRF, the RFSP of the UE based on the third RUCI report and subscription information of the UE.

In one embodiment, the sending, by the network device to the RAN, an SPID corresponding to the RFSP includes: sending, by the PCRF, an SPID delivery message to an MME by using a serving gateway SGW, where the SPID delivery message is used by the MME to send the SPID to the RAN based on the SPID delivery message.

In one embodiment, before the receiving, by the PCRF, congestion information that is of a RAN and that is sent by an RCAF, the method further includes: receiving, by the RCAF, a congestion information report sent by the RAN in which congestion occurs, where the congestion information report includes an identifier of the RAN in which congestion occurs; sending, by the RCAF, a UE identity request message to the MME based on the identifier of the RAN in which congestion occurs; and receiving, by the RCAF, a UE identity request response message sent by the MME, where the UE identity request response message includes an identifier of UE in the RAN in which congestion occurs.

According to the network congestion control method provided in the foregoing embodiments, the PCRF obtains, by using the RCAF, the congestion information on the RAN side, then dynamically adjusts the RFSP of the user equipment by using a policy, delivers the corresponding SPID to the RAN side to adjust an access priority of the user equipment, and controls camping or handover of the user to control network congestion.

According to a second aspect, an embodiment of this disclosure provides a network device, to implement the network congestion control method in the first aspect. The network device has a function of implementing the foregoing network congestion control method. The function may be implemented by hardware, or may be implemented by hardware by executing corresponding software. The hardware or software includes one or more modules corresponding to the foregoing function.

In a possible embodiment of the second aspect, the network device includes a plurality of function modules or units, configured to implement any network congestion control method in the first aspect.

In another possible embodiment of the second aspect, a structure of the network device may include a processor and a transceiver. The processor is configured to support the apparatus in performing a corresponding function in any network congestion control method in the first aspect. The transceiver is configured to support the apparatus in communicating with another network device, for example, a corresponding radio frequency module or a baseband module. The apparatus may further include a memory. The memory is configured to be coupled to the processor, and stores a program instruction and data that are required by the network device to perform the foregoing network congestion control method.

In one embodiment, the network device may be an MME or a PCRF.

According to a third aspect, an embodiment of this disclosure provides a computer storage medium, configured to store a computer software instruction used by the foregoing network device. The computer software instruction includes a program designed for performing the first aspect.

According to a fourth aspect, an embodiment of this disclosure provides a computer program product, including an instruction. When the computer program is executed by a computer, the instruction enables the computer to perform the function performed by the network device in the foregoing method.

According to a fifth aspect, an embodiment of this disclosure provides a service capability exposure function network element. The network element has a function of implementing the operation performed by the SCEF in the foregoing network congestion control method.

According to a sixth aspect, an embodiment of this disclosure provides a radio access network congestion awareness function network element. The network element has a function of implementing the operation performed by the RCAF in the foregoing network congestion control method.

According to a seventh aspect, a communications system is provided, and includes UE, a RAN, and the network device provided in the second aspect or the third aspect.

In one embodiment of the seventh aspect, the system further includes the network elements provided in the fifth aspect and the sixth aspect.

Compared with the prior art, in the method, the device, and the system provided in the embodiments of this disclosure, the network device dynamically configures a grouped RFSP of a user based on information such as RUCI without a need to modify the subscription information of the UE, selects, based on a user type and a service type, different networks/frequency bands/cells to control camping or handover, and instructs, by identifying a cell location, the user to select a frequency, to control congestion or the like. According to the network congestion control method provided in the embodiments of this disclosure, when a large quantity of UEs in a frequency band/cell have a higher-priority service request, UE having a lower-priority service can be controlled to access another frequency band/cell instead of reducing QoS of a service of the UE having the lower-priority service, so that congestion is better controlled.

DESCRIPTION OF EMBODIMENTS

Figure 1:
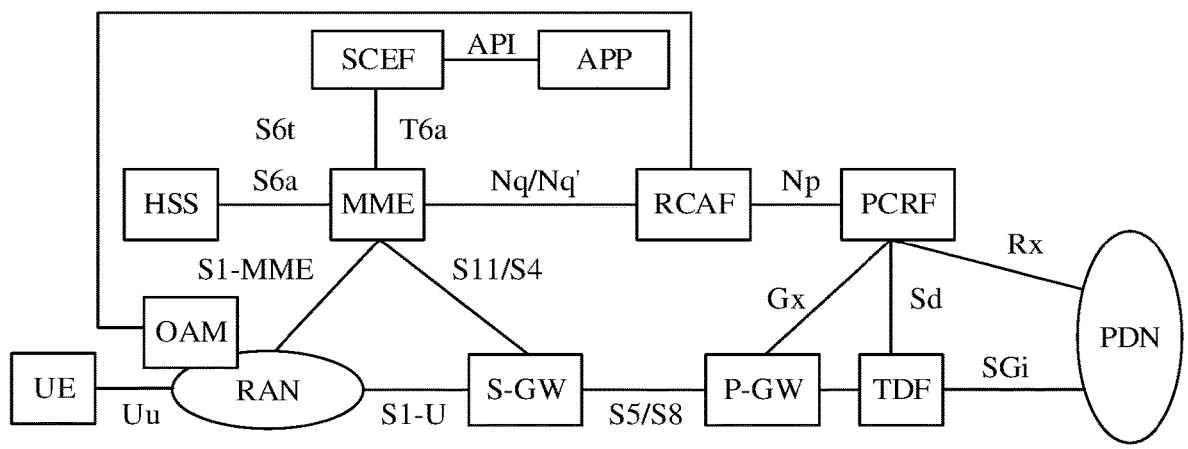
FIG. 1 is a schematic diagram of a mobile network architecture according to an embodiment of this disclosure.

The technical solutions provided in the embodiments of this disclosure are applicable to a mobile communication network. The mobile communication network in the embodiments of this disclosure refers to a combination of a transmission network, a network management subsystem, and different network element types. The different network element types undertake different network functions, such as a base transceiver station (BTS), a controller, and a core network (CN). The transmission network is used to connect to a network element, and the network management subsystem is configured to manage the network element and the transmission network.

UE in the embodiments of this disclosure mainly refers to a portable lightweight mobile terminal, for example, a smartphone, a tablet computer, or a PAD. A mobile network and a mobile terminal are interconnected by using a wireless interface, and a plurality of wireless technologies can be applied to the wireless interface. For example, the wireless technologies that can be applied to the wireless interface include a 4th generation (4G) mobile communications technology, or may be a 5th generation (5G) mobile communications technology that is currently being studied or even another mobile communications technology that is subsequently studied.

Network congestion control is commonly required by most operators currently, and is concerned by a 3GPP organization and an industry standards organization in China. In a 3GPP network architecture scenario, for network congestion, two congestion scenarios, namely, cell resource exhaustion and backhaul link resource insufficiency are defined, and 13 congestion management scenarios such as service control at a user layer, data control at an application layer, and differentiated charging are defined. A technical solution of the network congestion control mainly relates to user plane congestion awareness and user plane congestion release methods. Currently, two major types of technical solutions are proposed in research for congestion awareness and release: (1) Congestion management method based on a core network: The core network participates in a congestion management process in real time. A RAN transmits congestion information to a PCRF by using a method, and the PCRF delivers a targeted policy based on the received congestion information. (2) Congestion management method based on a RAN: Congestion information does not need to be reported to a core network. When congestion occurs, a wireless network performs corresponding processing based on a predefined rule.

A premise of the congestion management method based on a core network is reporting of the congestion information. In other words, the wireless network transmits the congestion information to the PCRF by using a corresponding method. An off-path congestion information reporting method is one of alternative solutions. To be specific, the congestion information is not transmitted by using main equipment in an EPC. An RCAF entity is newly added to a network. Based on a natural feature that a wireless network management system can monitor wireless network congestion, the RCAF obtains network congestion information from the network management system, arranges the network congestion information, supplements the network congestion information by user information, and sends information about a congested cell and an affected user to the PCRF. Most of this solution is implemented on a function entity other than the main equipment. Therefore, this solution has little impact on the main equipment, and has relatively good deployment flexibility.

FIG. 1 is a schematic diagram of a UPCON architecture. An EPC architecture obtained after an off-path congestion information reporting solution is introduced is shown in FIG. 1. As shown in FIG. 1, logical function units in the system architecture mainly include the following units.

(1) RAN: includes an eNB or a cell, provides a radio resource for access to a terminal, and may provide higher uplink and downlink rates, a lower transmission latency, and more reliable wireless transmission.

(2) Service capability exposure function (SCEF): is configured to: perform authentication and authorization, and support an external entity in discovering a network, executing a policy, accounting across operators, interconnecting with an external entity, and the like.

(3) MME: is configured to manage a control plane in a core network, where a main function of the MME includes mobility management, session management, access control, network element selection, user context storage, and the like.

(4) Home subscriber server (HSS): is a server configured to store user subscription information, and is mainly responsible for managing user subscription data and location information of a mobile user.

(5) RCAF: collects user plane congestion information of a RAN by using operation, administration and maintenance (OAM) information of the RAN, sends RUCI to a PCRF by using an Np interface, and obtains, from an MME, identity information of UE served by an eNB or a cell that is in a congested state by using an Nq interface.

(6) Serving gateway (S-GW): is a user plane entity, is responsible for user plane data routing processing, and terminates downlink data of UE that is in an idle state; manages and stores a system architecture evolution (SAE) bearer context of the UE; and is an anchor of a user plane in a 3GPP system.

(7) Packet data network gateway (P-GW): is a gateway that is responsible for UE accessing a packet data network (PDN), assigns a user IP address, and is a mobility anchor of both 3GPP and non-3GPP access systems.

(8) PCRF: The function entity includes policy control decision and flow-based charging control functions.

(9) Traffic detection function (TDF): detects an application program, reports the detected application program, and describes service data traffic of the detected application program to a PCRF.

In the UPCON architecture, the RCAF is added. The RCAF interacts with the OAM to learn of congestion information of an eNB or a cell, and queries, from the MME, information about a currently affected user in a congested cell and an APN by using an Nq/Nq' interface. The RCAF queries a corresponding PCRF by using Doppler radar (DRA), and sends information about a congested cell and a corresponding user to the corresponding PCRF by using the Np interface. To support network status-based policy management, the PCRF needs to enhance support for the Np interface to collect congestion information from the RCAF and to determine a control policy based on user plane congestion information, user subscription, an application type, a content type, and the like. The MME/SGSN needs to enhance support for the Nq/Nq' interface to report or respond, required by the RCAF, to the information about the user in the congested cell. OAM needs to be enhanced, so that the OAM can provide related congestion information including cell load for the RCAF. The RCAF closely and dynamically monitors the area. Once the RCAF learns from a network management system that a network is in an abnormal congestion state in which a physical resource that can be allocated is exhausted, a call drop rate increases sharply, or the like, to be specific, starts reporting the state to the PCRF. The PCRF learns of a list of abnormally congested cells and a list of active users in these cells by using the Np interface, and the PCRF delivers a network status-based congestion management policy based on an operator policy. For example, differentiated congestion management based on a user level can be implemented. To ensure service experience of an important user, only quality of service (QoS) of a lower-level user is intervened, so that experience of the important user is improved while overall cell congestion is relieved. A differentiated QoS policy can also be implemented based on service value. To ensure experience of user using a valuable service, QoS of low valuable services of all users is reduced, so that the experience of the user using the valuable service is improved while cell congestion is relieved. This can attract more users to subscribe to the valuable service.

However, in the prior art, a radio resource allocation policy is adjusted based on a service type, and congestion is controlled by optimizing configuration of a radio resource. When a large quantity of UEs in a frequency band/cell have a higher-priority service request, congestion is not better controlled by adjusting the radio resource allocation policy based on the service type.

To resolve the foregoing problem, an embodiment of this disclosure provides a network congestion control method. In this embodiment of this disclosure, the 3GPP system shown in FIG. 1 is used as an example to describe an application scenario of this disclosure. The following describes in detail the technical solutions in this disclosure with reference to specific embodiments. The following several specific embodiments may be combined with each other, and a same or similar concept or process may not be described repeatedly in some embodiments.

Figure 2:
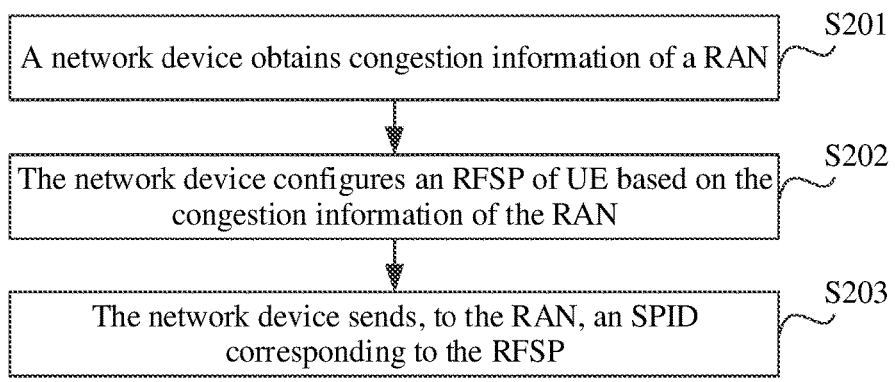
FIG. 2 is a schematic flowchart of a network congestion control method according to an embodiment of this disclosure.

FIG. 2 is a schematic flowchart of a network congestion control method according to an embodiment of this disclosure. As shown in FIG. 2, the network congestion control method provided in this embodiment includes the following operations:

S201. A network device obtains congestion information of a RAN.

For example, the congestion information on a RAN side may include one or more of the following information: an RUCI report, a network congestion level list, an identifier of the RAN, an identifier of UE, and the like.

S202. The network device configures an RFSP of UE based on the congestion information of the RAN.

S203. The network device sends, to the RAN, an SPID corresponding to the RFSP.

It should be noted that the SPID on a core network side is referred to as the RFSP. This information element may be specified by using user subscription information (stored in an HSS), or may be specified by an MME or a PCRF. After being transmitted to the RAN side, the information element can be used to flexibly control a behavior policy (for example, a priority for specifying that a terminal camps on a frequency and is handed over from one frequency to another frequency, to reduce an amount of useless signaling on a network) of the terminal.

S204. The RAN performs access control on the UE based on the SPID.

For example, the network device may be a network element (MME) responsible for mobility management, or may be a policy and charging rules function (PCRF) network element.

For example, the network device may receive congestion information that is on a RAN side and that is reported by an RCAF to the network device periodically or triggered by an event. For example, the RCAF may report the congestion information on the RAN side to the MME, and the RCAF may further report the congestion information on the RAN side to the PCRF.

For example, the network device may also receive congestion information that is on a RAN side and that is reported by another network element. For example, the MME may receive congestion information that is on a RAN side and that is reported by an SCEF.

According to the network congestion control method provided in this embodiment of this disclosure, the network device dynamically configures a grouped RFSP of a user based on information such as RUCI without a need to modify subscription information of the UE, selects, based on a user type and a service type, different networks/frequency bands/cells to control camping or handover, and instructs, by identifying a cell location, the user to select a frequency, to control congestion or the like. According to the network congestion control method provided in this embodiment of this disclosure, when a large quantity of UEs in a frequency band/cell have a higher-priority service request, UE having a lower-priority service can be controlled to access another frequency band/cell instead of reducing QoS of a service of the UE having the lower-priority service, so that congestion is better controlled.

Figure 3:
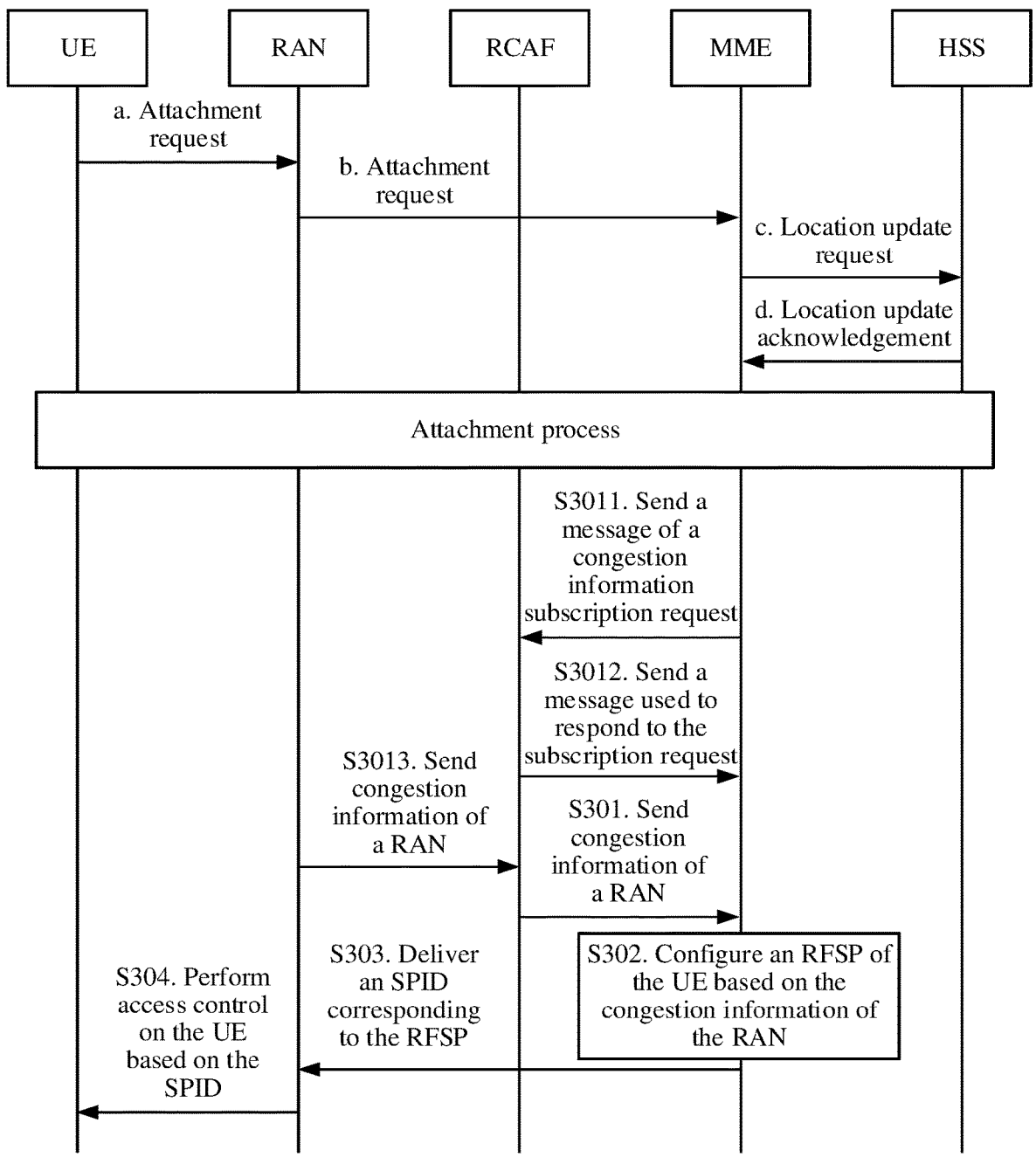
FIG. 3 is a schematic flowchart of a network congestion control method according to an embodiment of this disclosure.

FIG. 3 is a schematic flowchart of a network congestion control method according to an embodiment of this disclosure. In this embodiment, an example in which a network device is an MME is used to describe a technical solution in this disclosure.

As shown in FIG. 3, a process in which the MME obtains congestion information on a RAN side by using an RCAF and dynamically configures an RFSP/SPID by using the information and that is provided in this embodiment includes the following operations:

S301. The MME receives congestion information that is of a RAN and that is sent by the RCAF.

S302. The MME configures an RFSP of UE based on the congestion information of the RAN.

S303. The MME delivers, to the RAN, an SPID corresponding to the RFSP.

S304. The RAN performs access control on the UE based on the SPID.

It may be understood that after being attached to a network, the UE registers with mobile edge computing (MEC), and reports, at an application layer, a geographical location of the UE to an app deployed in the MEC. After converting the geographical location of the UE into a specific eNB/cell address, the MEC reports an address of the MEC to an SCEF. When the SCEF needs to initiate a location request, the SCEF may request a location of the UE from the MEC. For example, the location of the UE may include at least one of global positioning system (GPS) information, an E-UTRAN cell global identifier (ECGI), and the like.

In one embodiment, before S301, a process in which the UE is attached to a network is further included. As shown in operations a to d in FIG. 3, an attachment process in operations a to d is the same as that in the prior art. A user subscription RFSP is included when an HSS sends a location update acknowledgement message to the MME.

In one embodiment, before S301, S3011 to S3013 may be further included.

S3011. The MME sends a message of a congestion information subscription request to the RCAF, where the message may include identifiers (ID) of all eNB s/cells managed by the MME.

S3012. The RCAF sends, to the MME, a message used to respond to the subscription request.

S3013. The RAN sends congestion information of the RAN to the RCAF, where the congestion information may include an eNB ID/a cell ID.

Further, in S301, the congestion information that is of the RAN and that is sent by the RCAF to the MME may include congestion information of all eNBs/cells managed by the MME. For example, the congestion information that is of the RAN and that is sent by the RCAF to the MME may specifically include RUCI of all the eNBs/cells managed by the MME and a congestion level list formed by congestion levels of the eNBs/cells. Obviously, all or some of the eNBs/cells managed by the MME may be congested. A congestion level of an eNB/a cell that is actually congested may be determined based on an actual congestion status according to a preset congestion level division rule. A congestion level of an eNB/a cell that is not actually congested may be determined as a default value.

In S302, the MME obtains RUCI of each eNB/cell and a congestion level corresponding to each eNB/cell, may group a user with reference to user subscription information, a user location, and a network congestion level, and adjusts a value of the RFSP. For example, when adjusting the RFSP, the MME increases an access priority of a user with a higher level in a congested area based on a user level in user subscription data, and in addition, if an area has a higher congestion level, decreases an access priority of a user with a lower level based on a congestion level.

In S304, after obtaining the SPID, the RAN obtains a corresponding camping control policy based on a value of the SPID, and specifies that a user camps on a proper cell.

According to the network congestion control method provided in this embodiment, the MME reports, by using the RCAF, congestion statuses of all eNB s/cells managed by the MME, then dynamically adjusts the RFSP of the UE based on the obtained RUCI, delivers the corresponding SPID to the RAN to adjust an access priority of the user, and controls camping of the user to adjust network congestion.

Figure 4:
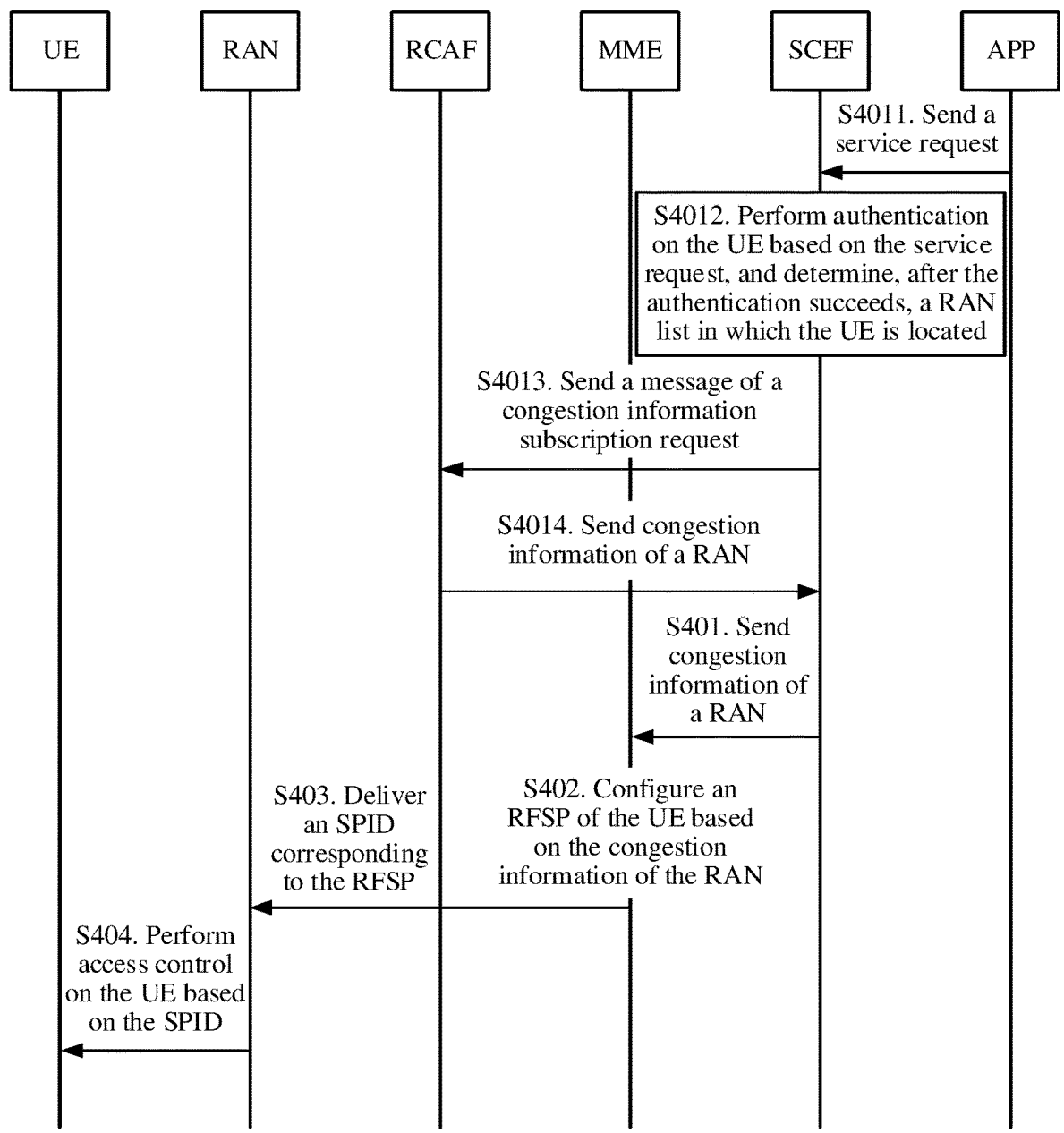
FIG. 4 is a schematic flowchart of a network congestion control method according to an embodiment of this disclosure.

FIG. 4 is a schematic flowchart of a network congestion control method according to an embodiment of this disclosure. In this embodiment, an example in which a network device is an MME is used to describe a technical solution in this disclosure.

As shown in FIG. 4, a process in which an SCEF obtains congestion information at a specific location (eNB/cell) from an RCAF based on different services and reports the congestion information to the MME, and the MME dynamically configures an RFSP/SPID by using the information and that is provided in this embodiment includes the following operations:

S401. The MME receives congestion information that is of a RAN and that is sent by the SCEF.

S402. The MME configures an RFSP of UE based on the congestion information of the RAN.

S403. The MME delivers, to the RAN, an SPID corresponding to the RFSP.

S404. The RAN performs access control on the UE based on the SPID.

It may be understood that some application (APP) programs send a service request to the SCEF, to optimize a service. The request may include information such as an app ID, a user external ID, and a user location.

It should be noted that the SCEF is mainly configured to: perform authentication and authorization, and support an external entity in discovering a network, executing a policy, accounting across operators, and interconnecting with an external entity. The SCEF may map a UE internal identifier to a UE external identifier. The SCEF performs authentication on a service request message based on the user external ID and the app ID to determine whether to initiate a subsequent procedure. If the authentication succeeds, the SCEF converts a geographical location of the UE into an eNB list/a cell list.

It should be further noted that the SCEF can approximately determine, by using a location of the UE, that the UE may be served by which eNB/cell, but cannot accurately determine a location of the UE. Therefore, the SCEF generates a group of eNB/cell lists in which the UE may be located.

In one embodiment, before S401, S4011 to S4013 may be further included.

S4011. The SCEF receives a service request sent by an app, where the service request includes location information of UE.

S4012. The SCEF performs authentication on the UE based on the service request, and determines, after the authentication succeeds, a RAN list in which the UE is located.

S4013. The SCEF sends a message of a congestion information subscription request to the RCAF, where the message may include IDs of all eNB s/cells in the RAN list determined in S4012, or may include an ID of the SCEF.

S4014. The RCAF sends congestion information of a RAN to the SCEF, where the congestion information may include RUCI of all the eNB s/cells in the RAN list requested by the SCEF.

It may be understood that before S4014, the RCAF may receive, from a RAN side, congestion information that is of a RAN and that is sent by the RAN to the RCAF.

Further, in S401, the congestion information that is of the RAN and that is sent by the SCEF to the MME may include the IDs of all the eNB s/cells in the RAN list determined in S4012, the RUCI of all the eNB s/cells in the RAN list, and an identifier of the UE, for example, an IMSI/MSISDN. It may also be understood that all or some of the eNBs/cells in the RAN list determined in S4012 may be congested.

In S402, the MME selects, from RUCI reported by the SCEF, congestion information of an eNB/a cell of a corresponding user based on the identifier (IMSI/MSISDN) of the UE, and then adjusts the RFSP of the UE based on a user location, the congestion information, and user subscription information. It may be understood that the subscription information of the UE may be obtained based on the identifier of the UE. For example, when adjusting the RFSP, the MME increases an access priority of a user with a higher level in a congested area based on a user level in user subscription data, and in addition, if an area has a higher congestion level, decreases an access priority of a user with a lower level based on a congestion level.

In S404, after obtaining the SPID, the RAN obtains a corresponding camping control policy based on a value of the SPID, and specifies that a user camps on a proper cell.

According to the network congestion control method provided in this embodiment, the network device configures the SPID for a specific user based on the service request of the application program. The SCEF requests, from the RCAF, congestion information of a RAN in a location range of a user, and then reports the congestion information to the MME. The MME dynamically adjusts the RFSP based on the congestion information and delivers the RFSP to the RAN to adjust an access priority of the user, and controls camping or handover of the user, to optimize a network of the specific user based on an application requirement.

Figure 5:
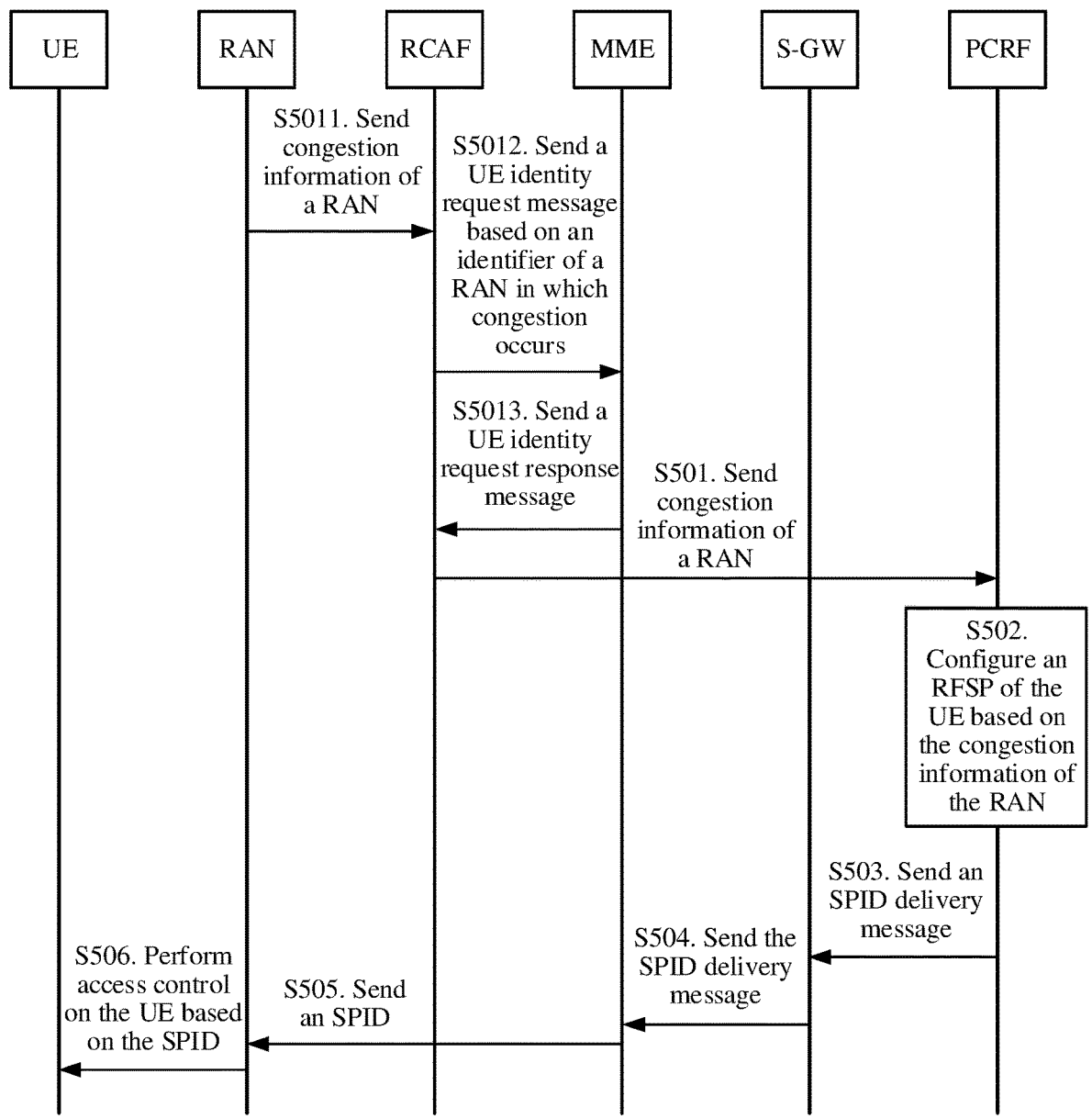
FIG. 5 is a schematic flowchart of a network congestion control method according to an embodiment of this disclosure.

FIG. 5 is a schematic flowchart of a network congestion control method according to an embodiment of this disclosure. In this embodiment, an example in which a network device is a PCRF is used to describe a technical solution in this disclosure.

As shown in FIG. 5, a process in which the PCRF obtains congestion information on a RAN side by using an RCAF and dynamically configures an RFSP/SPID by using the information and that is provided in this embodiment includes the following operations:

S501. The PCRF receives congestion information that is of a RAN and that is sent by the RCAF.

S502. The PCRF configures an RFSP of UE based on the congestion information of the RAN.

S503. The PCRF sends an SPID delivery message to an S-GW.

S504. The S-GW forwards the SPID delivery message to an MME.

S505. The MME sends an SPID to the RAN.

S506. The RAN performs access control on the UE based on the SPID.

It may be understood that in a related technology, when congestion occurs on the RAN side, an eNB sends a congestion information report to the RCAF, where the report may include an eNB ID/a cell ID.

In this embodiment of this disclosure, before S501, S5011 to S5013 may be further included.

S5011. The RCAF receives a congestion information report sent by a RAN in which congestion occurs, where the congestion information report includes an identifier of the RAN in which congestion occurs. In other words, the congestion information report carries an ID of a congested eNB/cell.

S5012. The RCAF sends a UE identity request message to the MME based on the identifier of the RAN in which congestion occurs.

S5013. The MME sends a UE identity request response message to the RCAF.

For example, the response message may include an identifier (IMSI/MSISDN) of the UE served by an eNB/a cell corresponding to the identifier of the RAN in S5011 or S5012. Further, the RCAF stores information such as the ID of the congested eNB/cell and the identifier of the UE, and sends the congestion information of the RAN to the PCRF.

Further, in S501, that the PCRF receives congestion information that is of a RAN and that is sent by the RCAF may include an RUCI report of a RAN (namely, the RAN in which congestion actually occurs) corresponding to the identifier of the RAN in S5011 or S5012 and the identifier of the UE.

In S502, the PCRF adjusts the RFSP of the UE based on the RUCI report of the RAN in which congestion actually occurs and subscription information of the UE. It may be understood that the subscription information of the UE may be obtained based on the identifier of the UE.

In S504, currently, there is no interface between the PCRF and the MME. Therefore, the SPID is forwarded by the SGW when being delivered, in other words, the PCRF may send the SPID delivery message to the MME by using the serving gateway SGW.

According to the network congestion control method provided in this embodiment, the PCRF obtains, by using the RCAF, the congestion information on the RAN side, then dynamically adjusts the RFSP of the user equipment by using a policy, delivers the corresponding SPID to the RAN side to adjust an access priority of the user, and controls camping or handover of the user to control network congestion.

Based on an idea that is the same as that in the foregoing method embodiments, an embodiment of this disclosure further provides a plurality of network devices. The plurality of network devices may be implemented by using software, hardware, or a combination of software and hardware, and may be configured to implement the network congestion control method provided in the foregoing method embodiments. The apparatus part corresponds to the foregoing method, and corresponding content and technical effects are the same as those in the foregoing method. Details are not described herein again.

Figure 6:
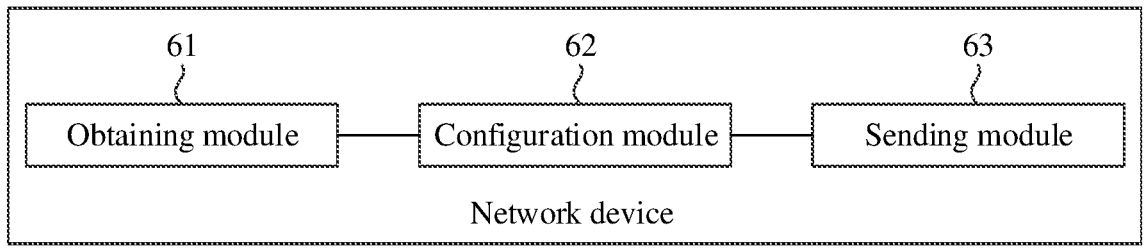
FIG. 6 is a schematic structural diagram of a network device according to an embodiment of this disclosure.

FIG. 6 is a schematic structural diagram of a network device according to an embodiment of this disclosure. As shown in FIG. 6, the network device may include an obtaining module 61, a configuration module 62, and a sending module 63.

Specifically, the obtaining module 61 is configured to obtain congestion information of a RAN. The configuration module 62 is configured to configure an RFSP of UE based on the congestion information of the RAN. The sending module 63 is configured to send, to the RAN, an SPID corresponding to the RFSP, where the SPID is used by the RAN to perform access control on the UE based on the SPID.

The network device provided in this embodiment of this disclosure may perform the foregoing method embodiment, and an implementation principle and a technical effect that are of the network device are similar to those of the foregoing method embodiment. Details are not described herein again.

Figure 7:
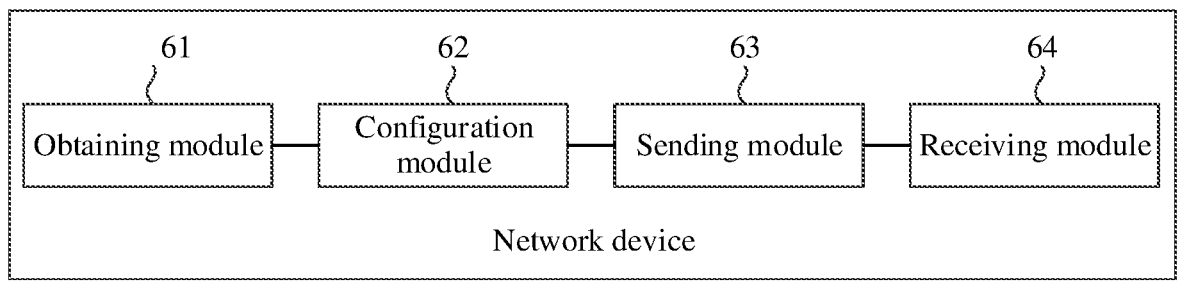
FIG. 7 is a schematic structural diagram of a network device according to an embodiment of this disclosure.

FIG. 7 is a schematic structural diagram of a network device according to an embodiment of this disclosure. This embodiment relates to a specific structure obtained when the network device is an MME.

In this embodiment, the obtaining module 61 is specifically configured to receive congestion information that is of a RAN and that is sent by an RCAF, where the congestion information of the RAN includes a first RUCI report and a network congestion level list, and the first RUCI comprises RUCI of all RANs managed by the MME.

In this embodiment, the configuration module 62 is specifically configured to adjust the RFSP of the UE based on the first RUCI report and the network congestion level list.

In one embodiment, the sending module 63 is further configured to send a message of a congestion information subscription request to the RCAF, where the message of the congestion information subscription request includes identifiers of all the RANs managed by the MME.

Based on the embodiment shown in FIG. 6, further, as shown in FIG. 7, the network device may further include a receiving module 64, configured to receive a message that is sent by the RCAF and that is used to respond to the subscription request.

The network device provided in this embodiment of this disclosure may perform the foregoing method embodiment, and an implementation principle and a technical effect that are of the network device are similar to those of the foregoing method embodiment. Details are not described herein again.

Figure 8:
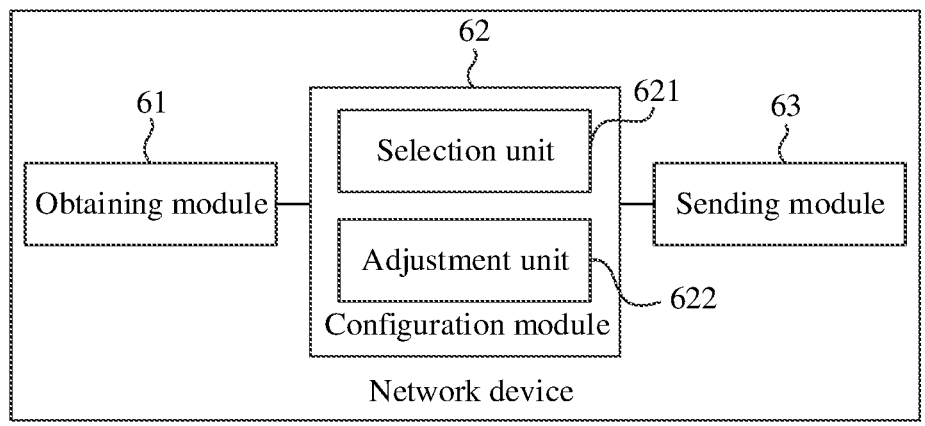
FIG. 8 is a schematic structural diagram of a network device according to an embodiment of this disclosure.

FIG. 8 is a schematic structural diagram of a network device according to an embodiment of this disclosure. This embodiment relates to a specific structure obtained when the network device is an MME.

In this embodiment, the obtaining module 61 is specifically configured to receive congestion information that is of a RAN and that is sent by an SCEF, where the congestion information of the RAN includes a second RUCI report, identifiers of all RANs specified by the SCEF, and an identifier of the UE, and the second RUCI comprises RUCI of all the RANs specified by the SCEF.

In this embodiment, the configuration module 62 specifically includes a selection unit 621 and an adjustment unit 622. The selection unit 621 is specifically configured to select, from the second RUCI report based on the identifier of the UE, congestion information of a RAN by which the UE is served. The adjustment unit 622 is specifically configured to adjust the RFSP of the UE based on a location of the UE, the congestion information of the RAN by which the UE is served, and subscription information of the UE.

The network device provided in this embodiment of this disclosure may perform the foregoing method embodiment, and an implementation principle and a technical effect that are of the network device are similar to those of the foregoing method embodiment. Details are not described herein again.

In one possible embodiment, the network device shown in FIG. 6 may also be a PCRF. The obtaining module 61 is specifically configured to receive congestion information that is of a RAN and that is sent by an RCAF, where the congestion information of the RAN includes a third RUCI report and an identifier of the UE, and the third RUCI comprises RUCI of a RAN in which congestion occurs. Further, the configuration module 62 is specifically configured to adjust the RFSP of the UE based on the third RUCI report and subscription information of the UE. Further, the sending module 63 is specifically configured to send an SPID delivery message to an MME by using a serving gateway SGW, where the SPID delivery message is used by the MME to send the SPID to the RAN based on the SPID delivery message.

Figure 9:
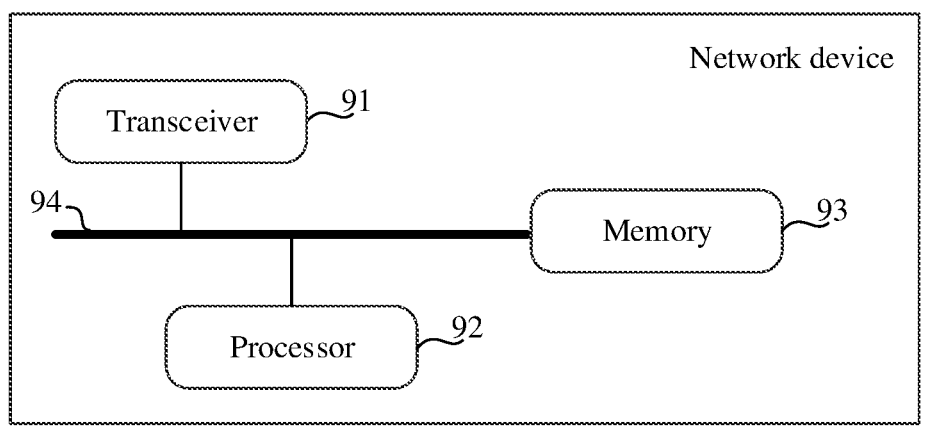
FIG. 9 is a schematic structural diagram of a network device according to an embodiment of this disclosure.

FIG. 9 is a schematic structural diagram of a network device according to an embodiment of this disclosure. As shown in FIG. 9, the network device may include a transceiver 91, a processor 92, a memory 93, and at least one communications bus 94. The communications bus 94 is configured to implement a communication connection between elements. The memory 93 may include a high-speed RAM, or may include a nonvolatile memory NVM, for example, at least one magnetic disk memory. The memory 93 may store various programs, and is configured to: complete various processing functions and implement operations in this embodiment. In one embodiment, the transceiver 91 may be a radio frequency module or a baseband module in the network device.

In this embodiment, the transceiver 91 is configured to obtain congestion information of a radio access network RAN. The processor 92 is configured to configure a frequency selection priority RFSP of user equipment UE based on the congestion information of the RAN. The transceiver is further configured to send, to the RAN, a selection priority identifier SPID corresponding to the RFSP, where the SPID is used by the RAN to perform access control on the UE based on the SPID.

In one possible embodiment, the network device may be an MME.

In this embodiment, the transceiver 91 may be specifically configured to receive congestion information that is of a RAN and that is sent by an RCAF, where the congestion information of the RAN includes a first access network user plane congestion information RUCI report and a network congestion level list, and the first RUCI comprises RUCI of all RANs managed by the MME.

Further, in this embodiment, the processor 92 may be specifically configured to adjust the RFSP of the UE based on the first RUCI report and the network congestion level list.

In this embodiment, the transceiver 41 may be further configured to: send a message of a congestion information subscription request to the RCAF, where the message of the congestion information subscription request includes identifiers of all the RANs managed by the MME; and receive a message that is sent by the RCAF and that is used to respond to the subscription request.

In one possible embodiment, the network device may be an MME.

In this embodiment, the transceiver 91 may be specifically configured to receive congestion information that is of a RAN and that is sent by an SCEF, where the congestion information of the RAN includes a second RUCI report, identifiers of all RANs specified by the SCEF, and an identifier of the UE, and the second RUCI comprises RUCI of all the RANs specified by the SCEF.

Further, in this embodiment, the processor 92 may be specifically configured to: select, from the second RUCI report based on the identifier of the UE, congestion information of a RAN by which the UE is served; and adjust the RFSP of the UE based on a location of the UE, the congestion information of the RAN by which the UE is served, and subscription information of the UE.

In one possible embodiment, the network device may be a PCRF.

In this embodiment, the transceiver 91 may be specifically configured to receive congestion information that is of a RAN and that is sent by an RCAF, where the congestion information of the RAN includes a third RUCI report and an identifier of the UE, and the third RUCI comprises RUCI of a RAN in which congestion occurs.

Further, in this embodiment, the processor 92 may be specifically configured to adjust the RFSP of the UE based on the third RUCI report and subscription information of the UE.

In this possible embodiment, the transceiver 91 is further specifically configured to send an SPID delivery message to an MME by using a serving gateway SGW, where the SPID delivery message is used by the MME to send the SPID to the RAN based on the SPID delivery message.

The network device provided in this embodiment of this disclosure may perform the foregoing method embodiment, and an implementation principle and a technical effect that are of the network device are similar to those of the foregoing method embodiment. Details are not described herein again.

In addition, an embodiment of this disclosure further provides a communications system, including UE, a RAN, and the network device provided in any one of the embodiments shown in FIG. 6 to FIG. 9.

The methods or algorithm operations described with reference to the content disclosed in this disclosure may be implemented by hardware, or may be implemented by a processor by executing a software instruction, or may be implemented by using a computer program product. The software instruction may include a corresponding software module. The software module may be stored in a RAM, a flash memory, a ROM, an EPROM, an EEPROM, a register, a hard disk, a removable hard disk, a CD-ROM, or a storage medium in any other form known in the art. For example, a storage medium is coupled to a processor, so that the processor can read information from the storage medium and can write information into the storage medium. Certainly, the storage medium may also be a component of the processor. The processor and the storage medium may be located in an ASIC. In addition, the ASIC may be located in user equipment. Certainly, the processor and the storage medium may also exist in the user equipment as discrete components.

Persons skilled in the art should be aware that in the foregoing one or more examples, functions described in this disclosure may be implemented by hardware, software, firmware, or any combination thereof. When these functions are implemented by software, the functions may be stored in a computer readable medium or transmitted as one or more instructions or code in the computer readable medium. The computer readable medium includes a computer storage medium and a communications medium, and the communications medium includes any medium that facilitates transmission of a computer program from one place to another. The storage medium may be any available medium accessible to a general-purpose computer or a dedicated computer.

In the several embodiments provided in this disclosure, it should be understood that the disclosed system, device, and method may be implemented in another manner without departing from the scope of this disclosure. For example, the foregoing described embodiment is merely an example. For example, the module or unit division is merely logical function division. There may be another division manner during some embodiments. For example, a plurality of units or components may be combined or integrated into another system, or some features may be ignored or not performed. The units described as separate parts may be or may not be physically separate, and parts displayed as units may be or may not be physical units, and may be located in one position, or may be distributed on a plurality of network units. Some or all of the modules may be selected based on an actual requirement to achieve the objectives of the solutions of the embodiments. Persons of ordinary skill in the art may understand and implement the embodiments without creative efforts.

In addition, the described system, device, and method and schematic diagrams of different embodiments may be combined or integrated with other systems, modules, technologies, or methods without departing from the scope of this disclosure. In addition, the displayed or discussed mutual couplings or direct couplings or communication connections may be implemented by using some interfaces. The indirect couplings or communication connections between the apparatuses or units may be implemented in electrical, mechanical, or another form.

It may be understood that "a plurality of" in the embodiments of this disclosure refers to two or more than two. Descriptions such as "first" and "second" in the embodiments of this disclosure are merely used for indicating and distinguishing between described objects, do not show a sequence, do not indicate that a quantity of devices is specifically limited in the embodiments of this disclosure, and cannot constitute any limitation on the embodiments of this disclosure.

Finally, it should be noted that the foregoing embodiments are merely intended for describing the technical solutions of this disclosure other than limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this disclosure.

The invention claimed is:

1. A network congestion control method, comprising:
obtaining, by a network device from a radio access network congestion awareness function, congestion information of a radio access network (RAN) corresponding to user equipment (UE), wherein the congestion information of the RAN comprises user plane congestion information of the RAN in which congestion occurs;
configuring, by the network device, a radio access technology/frequency selection priority (RFSP) of the UE based on the congestion information of the RAN; and
sending, by the network device to the RAN, a selection priority identifier corresponding to the RFSP, wherein the selection priority identifier is for performing access control on the UE based on the selection priority identifier;
wherein the network device is a policy and charging rules function.

2. The method according to claim 1, wherein the configuring, by the network device, the RFSP of the UE based on the congestion information of the RAN comprises:
adjusting, by the network device, the RFSP of the UE based on the user plane congestion information and subscription information of the UE.

3. The method according to claim 1, wherein the congestion information of the RAN further comprises a network congestion level list.

4. An apparatus, comprising:
at least one processor; and a memory, storing computer instructions, which when executed by the at least one processor, enable the apparatus to perform the following operations:

obtaining, from a radio access network congestion awareness function, congestion information of a radio access network (RAN) corresponding to user equipment (UE), wherein the congestion information of the RAN comprises user plane congestion information of the RAN in which congestion occurs;

configuring a radio access technology/frequency selection priority (RFSP) of the UE based on the congestion information of the RAN; and sending, to the RAN, a selection priority identifier corresponding to the RFSP, wherein the selection priority identifier is for performing access control on the UE based on the selection priority identifier;

wherein the apparatus is a policy and charging rules function.

5. The apparatus according to claim 4, wherein the configuring the RFSP of the UE based on the congestion information of the RAN comprises:

adjusting the RFSP of the UE based on the user plane congestion information and subscription information of the UE.

6. The apparatus according to claim 4, wherein the congestion information of the RAN further comprises a network congestion level list.

7. A system, comprising:
an apparatus; and
a radio access network (RAN), wherein the apparatus comprises:
  at least one processor; and
  a memory, storing computer instructions, which when executed by the at least one processor, enable the apparatus to perform the following operations:
    obtaining, from a radio access network congestion awareness function, congestion information of the RAN corresponding to user equipment (UE), wherein the congestion information of the RAN comprises user plane congestion information of the RAN in which congestion occurs;
    configuring a radio access technology/frequency selection priority (RFSP) of the UE based on the congestion information of the RAN; and
    sending, to the RAN, a selection priority identifier corresponding to the RFSP, wherein the selection priority identifier is for performing access control on the UE based on the selection priority identifier.

8. The system according to claim 7, wherein the configuring the RFSP of the UE based on the congestion information of the RAN comprises:

adjusting the system of the UE based on the user plane congestion information and subscription information of the UE.

9. The system according to claim 7, wherein the congestion information of the RAN further comprises a network congestion level list.

10. A non-transitory computer readable storage medium, comprising computer readable instruction, which when executed on a computer, cause the computer to perform the following operations:

obtaining, from a radio access network congestion awareness function, congestion information of a radio access network (RAN) corresponding to user equipment (UE), wherein the congestion information of the RAN comprises user plane congestion information of the RAN in which congestion occurs;

configuring a radio access technology/frequency selection priority (RFSP) of the UE based on the congestion information of the RAN; and sending, to the RAN, a selection priority identifier corresponding to the RFSP, wherein the selection priority identifier is for performing access control on the UE based on the selection priority identifier.

11. The non-transitory computer readable storage medium according to claim 10, wherein the configuring the RFSP of the UE based on the congestion information of the RAN comprises:

adjusting the system of the UE based on the user plane congestion information and subscription information of the UE.

12. The non-transitory computer readable storage medium according to claim 10, wherein the congestion information of the RAN further comprises a network congestion level list.

13. A method, comprising:

obtaining, by a network device from a radio access network congestion awareness function, congestion information of a radio access network (RAN) corresponding to user equipment (UE), wherein the congestion information of the RAN comprises user plane congestion information of the RAN in which congestion occurs;

configuring, by the network device, a radio access technology/frequency selection priority (RFSP) of the UE based on the congestion information of the RAN;

sending, by the network device to the RAN, a selection priority identifier corresponding to the frequency selection priority; and performing, by the RAN, access control on the UE based on the selection priority identifier;

wherein the network device is a policy and charging rules function.

14. The method according to claim 13, wherein the configuring, by the network device, the RFSP of the UE based on the congestion information of the RAN comprises:

adjusting, by the network device, the RFSP of the UE based on the user plane congestion information and subscription information of the UE.

15. The method according to claim 13, wherein the congestion information of the RAN further comprises a network congestion level list.

* * * * *